United States Patent [19]

Kikuchi et al.

[11] Patent Number: 5,621,744
[45] Date of Patent: Apr. 15, 1997

[54] CONTINUOUS-WAVE ULTRAVIOLET LASER LIGHT GENERATING APPARATUS

[75] Inventors: Hiroki Kikuchi; Asif A. Godil, both of Tokyo; Michio Oka, Kanagawa, all of Japan

[73] Assignee: Sony Corporation, Tokyo, Japan

[21] Appl. No.: 544,195

[22] Filed: Oct. 17, 1995

[30] Foreign Application Priority Data

Oct. 18, 1994 [JP] Japan ................................ 6-252480

[51] Int. Cl.$^6$ ........................................ H01S 3/11
[52] U.S. Cl. ................... 372/12; 372/26; 372/21; 372/33; 372/4; 372/18
[58] Field of Search ........................... 372/26, 21, 4, 372/33, 18, 12, 92, 98, 38

[56] References Cited

U.S. PATENT DOCUMENTS

| | | |
|---|---|---|
| 5,278,869 | 1/1994 | Naya et al. .................. 372/22 |
| 5,463,647 | 10/1995 | Pan ............................. 372/12 |
| 5,552,926 | 9/1996 | Owa et al. ..................... 372/22 |

*Primary Examiner*—Leon Scott, Jr.
*Attorney, Agent, or Firm*—Hill, Steadman & Simpson

[57] ABSTRACT

A continuous-wave ultraviolet laser light generating apparatus includes a laser light source unit (1) for generating laser light from visible light to near-infrared light, a wavelength converting means (4) which includes an optical resonator (2) and a wavelength convertor (3) disposed in the optical resonator (2) for converting a wavelength of incident laser light and which converts the laser light from the laser light source unit (1) into continuous-wave ultraviolet laser light $L_{UL}$ to emit the latter, a locking means (5) for adjusting the optical resonator (2) so as to have a predetermined cavity length, and an electrooptic phase modulator (6) for modulating a phase of the laser light from the laser light source unit in response to a resonance frequency of the optical resonator. The electrooptic phase modulator (6) is made of an electrooptic crystal (11) having a composition of $ATiOXO_4$ where A depicts any one of K, Cs and Rb and X depicts any one of P and As.

5 Claims, 7 Drawing Sheets

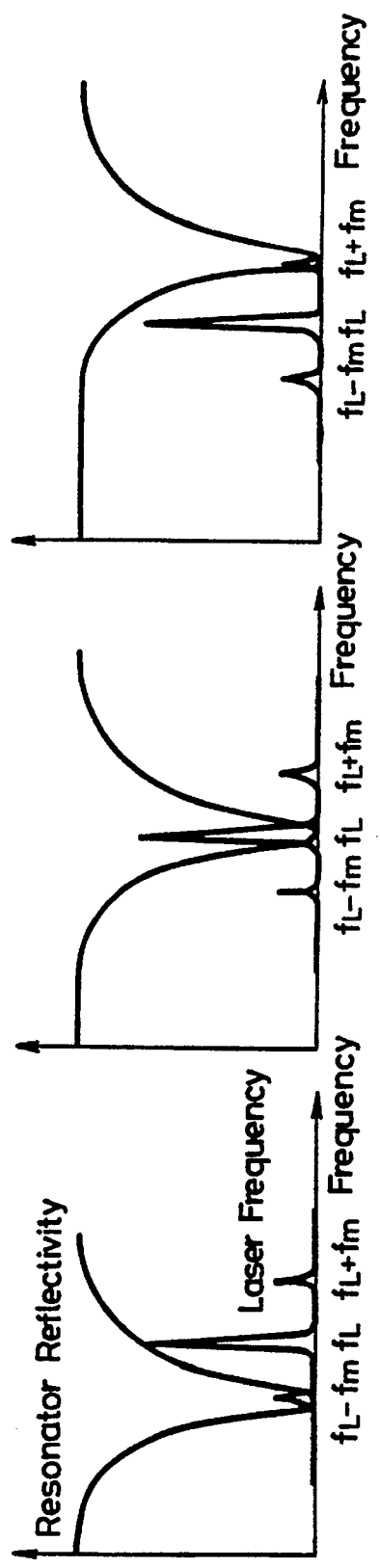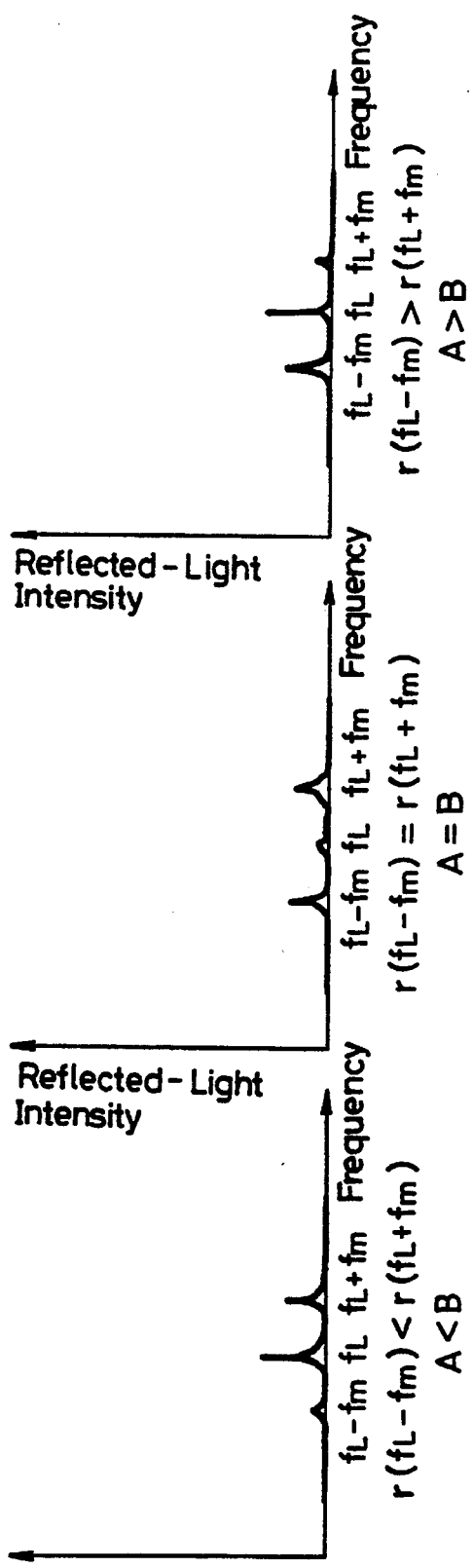

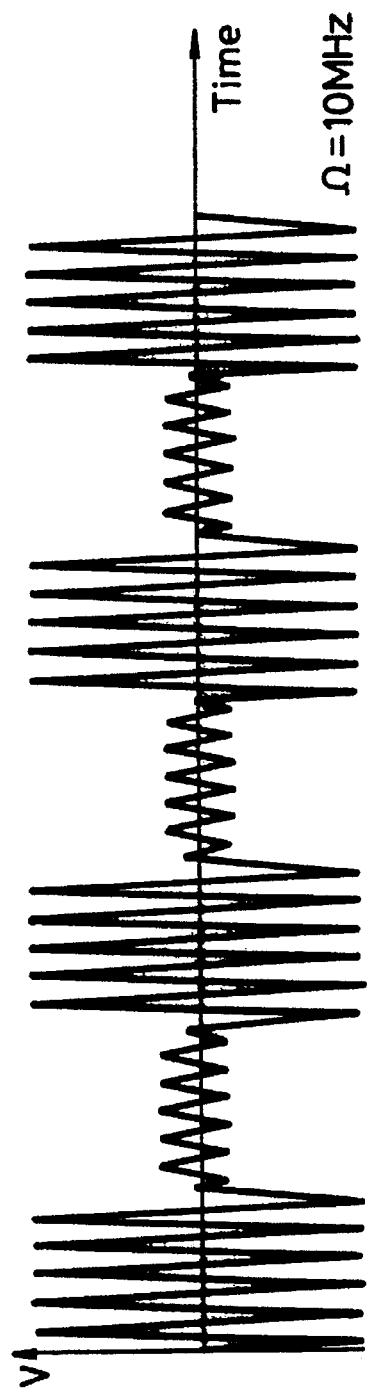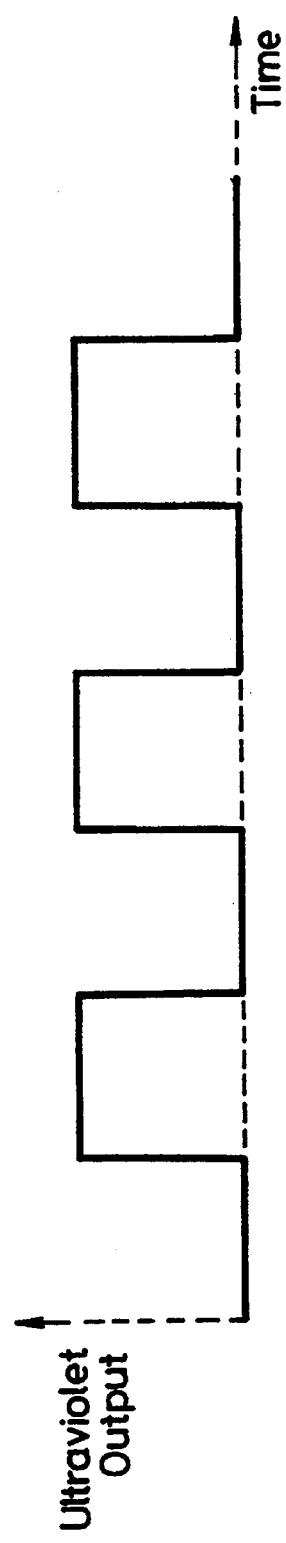
FIG. 8A
FIG. 8B

CONTINUOUS-WAVE ULTRAVIOLET LASER LIGHT GENERATING APPARATUS

BACKGROUND OF THE INVENTION

The present invention relates to a continuous-wave ultraviolet laser light generating apparatus suitable for use in a continuous-wave ultraviolet laser light generating apparatus used as a light source used when a material is processed or worked by photolithography.

FIG. 1 is a schematic diagram showing an arrangement of a continuous-wave ultraviolet laser light generating apparatus. A continuous-wave ultraviolet laser light generating apparatus has been proposed, which, as shown in FIG. 1, has a laser light source unit 1 for generating green laser light, for example, a wavelength converting apparatus 4 that includes an optical resonator, i,e., a so-called external optical resonator 2 and a wavelength convertor 3 disposed therein and converts a wavelength of the laser light emitted from the laser light source unit 1 to derive continuous-wave ultraviolet laser light $L_{UL}$, a locking circuit 5 for locking a cavity length of the optical resonator 2 at a predetermined cavity length, and an electrooptic phase modulator 6 used for the locking.

In this case, the laser light source unit 1 employs, for example, a continuous-wave Nd: yttrium aluminum garnet (YAG) laser (not shown) as a light source. A second harmonic generator (SHG) (not shown) at the first stage derives green laser light with a wavelength of 532 nm from the laser light from the light source.

The green laser light with a wavelength of 532 nm, for example, emitted from the laser light source unit 1 is converted by a SHG at the second stage composing the wavelength convertor 3 in the above wavelength converting apparatus 4 to obtain the continuous-wave ultraviolet laser light as a forth harmonic of the above YAG laser.

The optical resonator 2 is formed of at least one pair of mirrors, e.g., four mirrors $M_1$ to $M_4$ as shown in FIG. 1. The wavelength convertor 3 is disposed in an optical path formed by the four mirrors $M_1$ to $M_4$.

The wavelength convertor 3 is formed of a nonlinear optical crystal made of BBO (β-BaB$_2$O$_4$), for example.

The above-mentioned optical resonator 2 is provided in the continuous-wave ultraviolet laser light generating apparatus in order to effectively and stably generate light having a predetermined wavelength, i.e., ultraviolet laser light. By Drever locking method, a resonance frequency of the optical resonator 2 is set equal to a frequency of the green laser light, for example, emitted from the laser light source unit 1 and introduced into the optical resonator 2, thereby the green laser light being effectively introduced into the optical resonator 2. This method allows stable generation of the ultraviolet laser light $L_{UL}$ having a desired wavelength, e.g., 266 nm (see Japanese laid-open patent publication No. 53593/1994).

In this case, for example, one mirror $M_1$ composing the optical resonator 2 is attached to an electromagnetic positioning device, i.e., a voice coil motor (VCM) 7. The VCM 7 is driven to finely move the mirror $M_1$, thereby an optical path length in the optical resonator 2 being finely changed. Specifically, the locking circuit 5 controls the VCM 7, i.e., controls the position of the mirror $M_1$, so that it is possible to control the resonance frequency fr. Thus, only light having a certain frequency is introduced into the optical resonator 2 and any light having other frequencies is reflected.

FIG. 2 shows reflectivity characteristics of the optical resonator 2. A horizontal axis depicts a frequency of incident light, and a vertical axis depicts a reflectivity of the optical resonator 2. As shown in FIG. 2, the reflectivity with respect to the light having the resonance frequency fr is 0%, and the reflectivity with respect to other light is about 100%. The resonance frequency fr is determined by an optical path in an external resonator. A width Δfr of the frequency of the light which can be transmitted through a mirror is determined by reflectivity of each mirror.

On the other hand, as shown in FIG. 3, a frequency $f_L$ of the incident laser light introduced from the laser light source unit 1 into the optical resonator 2 is distributed over a certain width $\Delta f_L$. However, the width $\Delta f_L$ is considerably small compared with the width Δfr.

In an arrangement employing the Drever locking method, a photodetector 8 such as a photodiode or the like for detecting light reflected by the optical resonator 2 is provided as shown in FIG. 1. An intensity of the reflected light is obtained by multiplication of the reflectivity of the optical resonator 2 shown in FIG. 2 and the laser light frequency shown in FIG. 3. It is assumed that the resonance frequency fr is changed as shown in FIG. 4A by moving the mirror $M_1$ from a position A to a position E, for example. At this time, the reflected-light intensity is changed as shown in FIG. 4C. If the mirror $M_1$ is fixed to a position where the reflected-light intensity is 0 (a position C shown in FIG. 4C), then the resonance frequency fr and the laser light frequency become coincident with each other, thereby the incident laser light being introduced into the optical resonator 2.

As described above, however, since the frequency of the incident laser light is fluctuated in fact from time to time, it is necessary to constantly adjust the position of the mirror $M_1$ by following detected difference between the laser frequency $f_L$ and the resonating frequency fr. To this end, it is not sufficient to only detect the above-mentioned position where the reflected-light intensity is 0, because it is impossible to determine whether the difference between the laser frequency $f_L$ and the resonance frequency fr is caused by a relationship of fr<$f_L$ (obtained at a mirror position B shown in FIG. 4C) or fr>$f_L$ (obtained at a mirror position D shown in FIG. 4C), only by detecting the reflected-light intensity (in other words, an even function whose center is a point satisfying fr=$f_L$ is established in the graph of FIG. 4C).

It is necessary that an error signal whose polarity is inverted depending upon fr>$f_L$ or fr<$f_L$ is generated and a servo control to tune the resonance frequency fr to the laser frequency $f_L$ is effected based on the error signal. To this end, the phase modulator 6 shown in FIG. 1 is provided to modulate a phase of the laser light for generating sidebands of the laser-light frequency. When the phase modulation is carried out at a frequency fm, the sidebands are generated at frequencies $f_L$±fm in addition to the laser frequency $f_L$ as shown in FIG. 5.

Subsequently, a principle of generating the error signal from the reflected light obtained when the laser light having the generated side bands is incident on the optical resonator 2 and reflected thereby will be described below with reference to FIGS. 6A to 6F which are diagrams showing spectra of the reflected-light intensity.

The reflected light from the optical resonator 2 has three components of frequencies of $f_L$–fm, $f_L$, and $f_L$+fm as shown in FIGS. 6D to 6F. When the reflected light is detected by the photodetector 8, the signal currents having the following three components are measured:

(1) a DC reflected-light intensity component $I_{DC}$;

(2) a beat signal (an amplitude A) $I_{AC1}$ with the frequency fm obtained from the difference between the frequencies of the light having the frequency $f_L$ and the light having the frequency $f_L$–fm, i.e., $$I_{AC1}=A \exp[-i2\pi fm\ t];$$

and (3) a beat signal (an amplitude B) $I_{AC2}$ with the frequency fm obtained from the difference between the frequencies of the light having the frequency $f_L$ and the light having the frequency $f_L$+fm, i.e., $$I_{AC2}=B \exp[i2\pi fm\ t].$$

If the mirror $M_1$ is moved to change the resonance frequency of the optical resonator 2 around the laser frequency as shown in FIGS. 6A to 6C, then the spectra of the reflected light shown in FIGS. 6A to 6C are changed as shown in FIGS. 6D to 6F, respectively. Specifically, an intensity relationship between the light having the frequency $f_L$–fm and the light having the frequency $f_L$+fm is reversed at the frequency at which the resonance frequency is coincident with the laser frequency. This fact reveals that an intensity relationship between the amplitudes A and B of the two beat signals $I_{AC1}$ and $I_{AC2}$ is also reversed around a resonance point. A position where the intensity relationship between the amplitudes A and B is reversed is detected and the mirror $M_1$ is set at the position, thereby the resonance frequency and the laser frequency becoming coincident with each other.

When it is determined which is larger, the amplitude A or the amplitude B, a phase delay amount of an AC signal $I_{AC}$ from the photodetector 8 is utilized. The AC signal $I_{AC}$ is obtained by linear combination of the beat signals $I_{AC1}$ and $I_{AC2}$ and has a phase delay amount $\phi$ in response to a ratio of the amplitude A to the amplitude B.

$$\begin{aligned}I_{AC} &= A\exp[-i2\pi fm\ t]+B\exp[i2\pi fm\ t] \\ &= C\exp i(2\pi fm\ t+\phi)\end{aligned}$$

Since values of the phase delay amount $\phi$ can be represented by an odd function whose center is the point satisfying fr=$f_L$, the phase delay amount $\phi$ can be employed as the error signal. Specifically, the phase delay amount $\phi$ is detected, and the servo control is effected on the VCM 7 for controlling the position of the mirror $M_1$ based on the phase delay amount $\phi$, i.e., the error signal. Thus, a cavity length, i.e., the resonance frequency of the optical resonator 2 is made coincident with the frequency of the incident laser light. Accordingly, the laser light is effectively introduced into the optical resonator 2. FIG. 7 shows an example of the error signal (which is represented by a curve 20 in FIG. 7).

As described above, when the continuous-wave. ultraviolet laser light generating apparatus employs the Drever locking method, it is possible to stably and effectively generate the desired ultraviolet laser light. However, when the continuous-wave ultraviolet laser light generating apparatus is practically fabricated, there are various problems.

When the Drever locking method is employed as described above, the electrooptic phase modulator 6 is employed as shown in FIG. 1. Specifically, the phase modulator 6 is made of an electrooptic crystal presenting an electrooptic effect in which a refractive index thereof is changed depending upon an applied voltage. When an AC voltage having a frequency $\Omega$ is applied to the electrooptic crystal and laser light is made incident on the electrooptic crystal, a phase of transmitted light is modulated in a sine fashion. For effecting the above-mentioned Drever locking, phase modulation with phase modulation depth $\beta$ of about 0.1 is effected on incident green light. The phase modulation depth $\beta$ depicts an amplitude of phase modulation obtained when a sine phase modulation is effected. An electric field $E_{pm}$ of the laser light modulated in the above manner is represented by the following equation;

$$E_{pm}=E_o \exp j\{\omega t+\beta \sin \Omega t\}$$

where $E_o$ depicts a field amplitude of the laser light, $\omega$ depicts the frequency of the incident laser light, and $\Omega$ depicts a modulation frequency. A magnitude of the phase modulation depth $\beta$ is given by a figure Q of merit of the electrooptic phase modulation of a crystal, a length l of the crystal, a distance d between electrodes, and an amplitude $V_o$ of an AC voltage applied to the crystal, being represented by the following equation;

$$\beta=(\pi Q v_o/\lambda)(l/d)$$

where $\lambda$ depicts a wavelength of incident light.

On the other hand, it is possible to modulate an intensity of the ultraviolet laser light $L_{UL}$ by modulating the magnitude of the phase modulation depth $\beta$. When $\beta$=0.1, the ultraviolet laser light intensity is almost maximum. As the phase modulation depth $\beta$ is increased, the ultraviolet laser light intensity is decreased. When $\beta$=2.4, the ultraviolet laser light intensity becomes almost 0. Specifically, it is possible to modulate the ultraviolet laser light $L_{UL}$ in a digital or analog fashion by modulating an amplitude of a high-frequency signal applied to an optical phase modulator.

It is possible to effect automatic power control (APC) by monitoring the ultraviolet laser light intensity and feeding it back to the phase modulator 6. FIGS. 8A, 8B are schematic diagrams showing digital modulation using the modulation of the phase modulation depth $\beta$. FIG. 8A shows a signal voltage which is applied to the phase modulator and obtained by modulating an amplitude of a carrier signal of a frequency $\Omega$. FIG. 8B shows an ultraviolet laser light intensity obtained at this time.

The electrooptic crystal composing the electrooptic phase modulator for use in the Drever locking in the above-mentioned continuous-wave ultraviolet laser light generating apparatus is selected from those satisfying the following conditions:

(1) an amount of light with a wavelength of 532 nm which the crystal absorbs small;

(2) an optical damage of the crystal is prevented from being generated by a high-power laser light with a wavelength of 532 nm, specifically, the crystal can endure the laser light with an intensity of about 10 W; and (3) the crystal's figure Q of merit for the electrooptic phase modulation is high and hence the crystal can be driven at a low voltage.

Crystals for use in the phase modulation of visible light are roughly divided into two groups: one group includes systems of lithium tantalate (LiTaO$_3$) (hereinafter referred to as LT) and lithium niobate (LiNbO$_3$) (hereinafter referred to as NT); and the other group includes systems of potassium dihydrogenphosphate (KH$_2$PO$_4$) (hereinafter referred to as KDP) and ammonium dihydrogenphosphate (NH$_4$H$_2$PO$_4$) (hereinafter referred to as ADP). Crystals of the LT and NT systems have high figures of merit for the electrooptic phase modulation but have low durability against optical damage. Therefore, it is impossible to employ these crystals in the continuous-wave ultraviolet laser employing the high-power laser light.

Accordingly, the phase modulator of this kind employs the electrooptic crystal made of KDP or ADP.

However, the phase modulator made of the electrooptic crystal of KDP or ADP is encountered by the following problems.

(1) The figure of merit required for the phase modulator is small so that a high drive voltage is required. The figures of merit of KDP and ADP are 34 pm/V and 27 pm/V, respectively. If the crystal length l=12 mm and the distance d between electrodes d=3 mm, it is necessary to respectively apply the AC voltages with the amplitudes $V_o$ of 125 V and 157 V to the KDP and the ADP for realizing $\beta$=0.1. The phase modulation frequency $\Omega$ of the continuous-wave ultraviolet laser is about $\Omega$=10 Mhz. A complicated high-frequency amplifier circuit is required to obtain such high-frequency and large-amplitude signal voltage, which increases production costs of the phase modulator and the overall size of the apparatus and leads to disadvantage in practical use.

On the other hand, if the crystal length is increased for reducing the drive voltage, there is then the problem that production costs of the crystal are increased and the phase modulator becomes large-sized.

If the distance d between the electrodes is decreased for reducing the drive voltage, there is then the problem that an incident aperture of the phase modulator for the incident laser light becomes small to thereby reduce a diameter of the laser beam which can be incident on the phase modulator.

As described above, it is difficult to drastically reduce the drive voltage, and the complicated, expensive high-frequency amplifier circuit is required.

(2) Since the phase modulator formed of KDP or ADP requires a high voltage as described above, it is difficult to effect the digital modulation, the analog modulation and the APC of the ultraviolet laser light by modulating the phase modulation depth $\beta$.

For stopping emission of the ultraviolet laser light (by setting $\beta$=2.4), a high-frequency voltage having an amplitude of about 3 kV is required.

(3) Moreover, since the KDP and ADP are chemically unstable and highly deliquescent, they are chemically changed by their absorption of moisture from the air. Therefore, when optical crystals made of the KDP and the ADP are used, they are immersed in oil or enclosed in nitrogen gas and further they must be sealed by shielding them with a complete shielding body in order to shield them from the outside airtightly. However, if the optical crystal is completely sealed by the shielding body and further the shielding body is provided with windows for incident laser light and emitted laser light, then there is not only the problems of complicated manufacturing process, expensive costs and unsatisfactory reliability but also the problem that a material for the windows and the oil used for oil immersion reduce amounts of the incident light and the emitted light.

SUMMARY OF THE INVENTION

In view of such aspects, an object of the present invention is to provide an electrooptic phase modulator which improves the above-mentioned problems and a laser light generating apparatus employing it.

According to a first aspect of the present invention, the continuous-wave ultraviolet laser light generating apparatus includes a laser light source unit for generating laser light from visible light to near-infrared light, a wavelength converting means which includes an optical resonator and a wavelength convertor disposed in the optical resonator for converting a wavelength of incident laser light and which converts the laser light from the laser light source unit into continuous-wave ultraviolet laser light to emit the latter, a locking means for adjusting the optical resonator so as to have a predetermined cavity length, and an electrooptic phase modulator for modulating a phase of the laser light from the laser light source unit in response to a resonance frequency of the optical resonator.

The electrooptic phase modulator is made of an electrooptic crystal having a composition of $ATiOXO_4$ where A depicts any one of K, Cs and Rb and X depicts any one of P and As. Specifically, the electrooptic phase modulator is formed of the electrooptic crystal made of any one of KTP ($KTiOPO_4$), KTA ($KTiOAsO_4$), RTA ($RbTiOAsO_4$), RTP ($RbTiOPO_4$), and CTA ($CsTiOAsO_4$).

According to a second aspect of the present invention, a groove is formed on the electrooptic crystal of the electrooptic phase modulator along an optical path direction and one of electrodes is formed along the groove.

According to a third aspect of the present invention, the electrooptic phase modulator is formed as a resonator circuit for amplifying an input AC voltage.

According to a forth aspect of the present invention, the electrooptic phase modulator modulates an intensity of ultraviolet laser light by modulating a modulation depth.

According to a fifth aspect of the present invention, the locking means is a Drever locking circuit.

BRIEF DESCRIPTION OF THE DRAWINGS

FIGS. 6A to 6F are graphs showing spectra of reflected-light intensity upon phase modulation;

FIG. 8A is a graph showing a voltage applied to an electrooptic phase modulator;

FIG. 8B is a graph showing an ultraviolet laser light output;

DESCRIPTION OF THE PREFERRED EMBODIMENTS

According to the present invention, an electrooptic modulator used for locking in a continuous-wave ultraviolet laser light generating apparatus is formed of an electrooptic crystal made of KTP or its derivative. The electrooptic crystal made of KTP or its derivative does not absorb much incident light with a wavelength of 532 nm which is wavelength-converted by a wavelength convertor to obtain the ultraviolet laser light therefrom. The electrooptic crystal has considerable immunity from optical damage and hence can effect long-life and stable electrooptic modulation with excellent characteristics. Moreover, since the KTP or its derivative has large figure Q of merit in the electrooptic modulation, it is possible to miniaturize the electrooptic modulator and reduce an amplitude of a modulation AC voltage to be applied thereto for realizing β=0.1, for example. Thus, it is possible to avoid use of a complicated high-frequency amplifier circuit. Since the electrooptic crystal made of KTP or its derivative is not deliquescent, it is unnecessary to provide a shielding body for airtightly shielding the electrooptic crystal from the outside and to provide windows incidental thereto for allowing light to be transmitted therethrough. Therefore, it is possible to achieve a simplified arrangement of the phase modulator, a miniaturized phase modulator, a simplified assembling process, and reduced costs. Moreover, it is possible to improve problems such as optical loss at a window.

Figure 1:
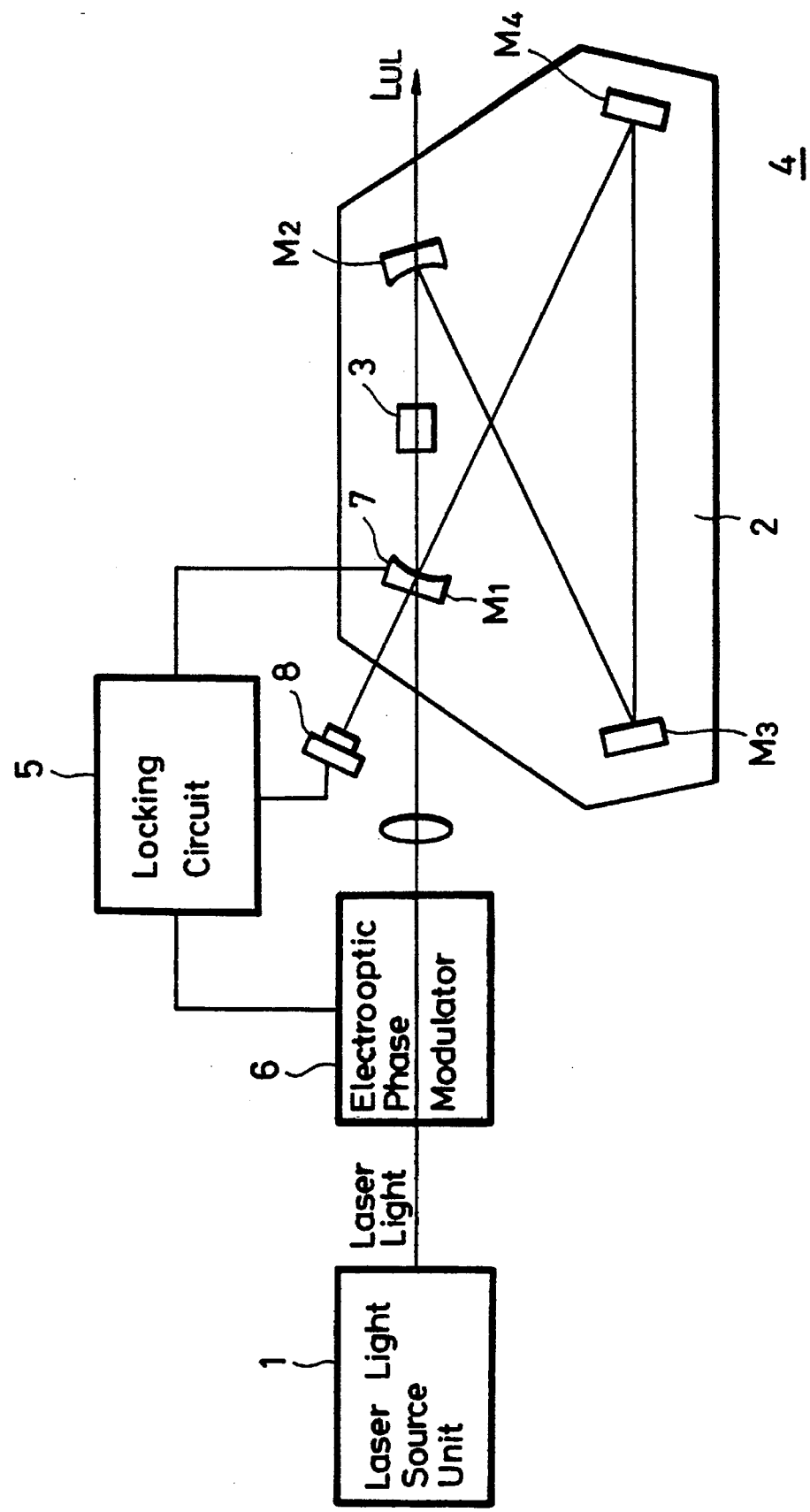
FIG. 1 is a diagram showing an arrangement of a continuous-wave ultraviolet laser light generating apparatus according to an embodiment of the present invention.
Figure 2:
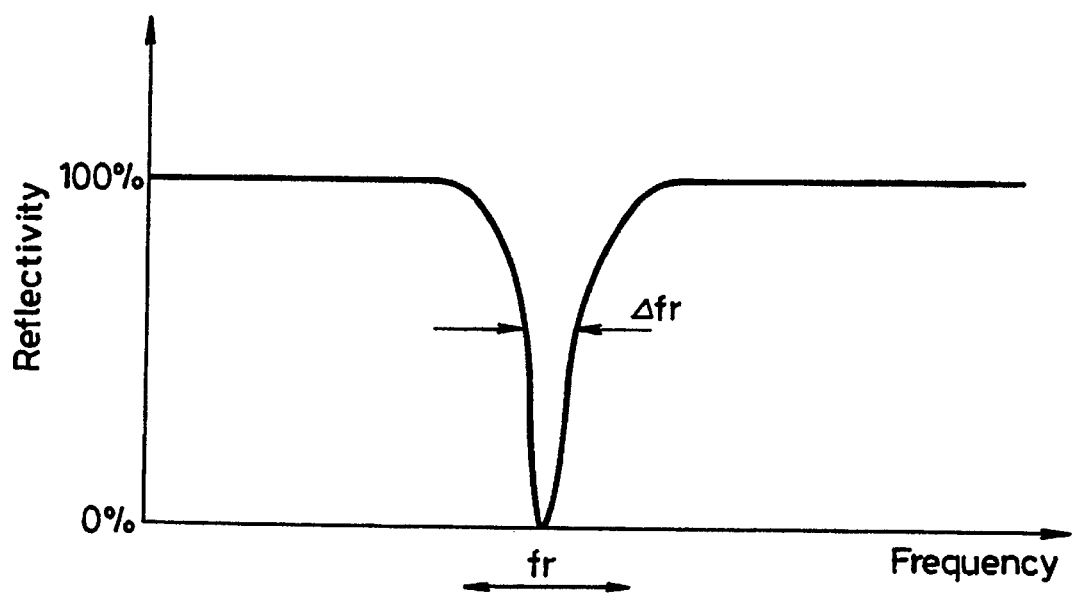
FIG. 2 is a graph of a characteristic curve showing reflectivity of an optical resonator.
Figure 3:
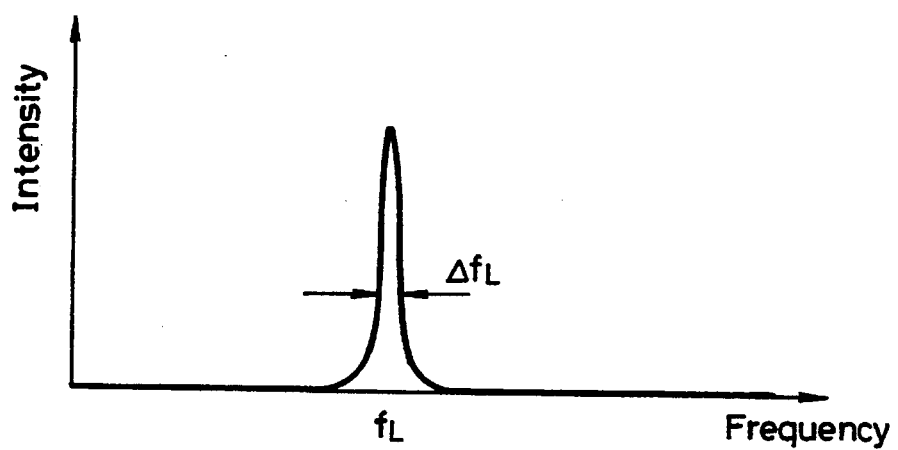
FIG. 3 is a graph showing a spectrum of a laser frequency.
Figure 4A:
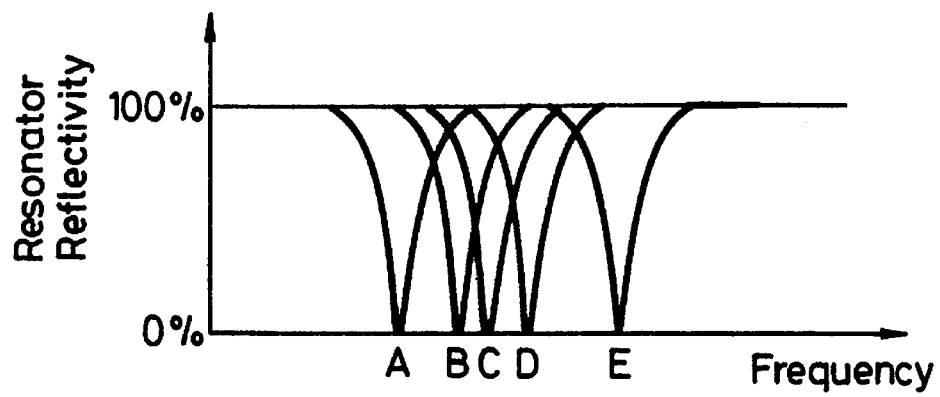
FIG. 4A is a graph showing a relation between movement of a mirror of the optical resonator and the reflectivity of the optical resonator.
Figure 4B:
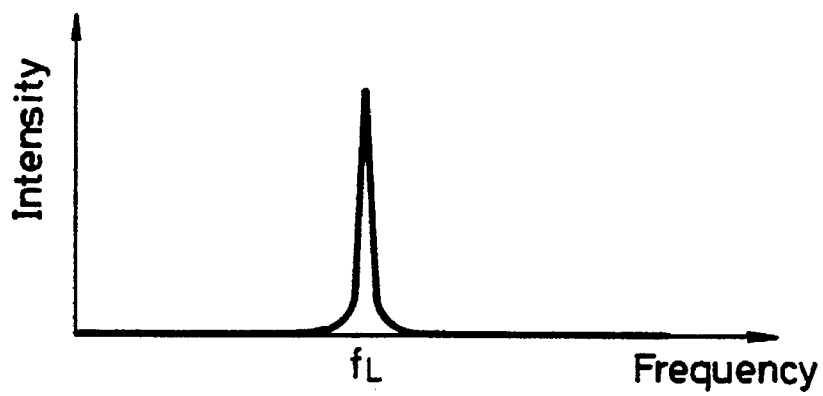
FIG. 4B is a graph showing a relation between the movement of the mirror of the optical resonator and a laser intensity.
Figure 4C:
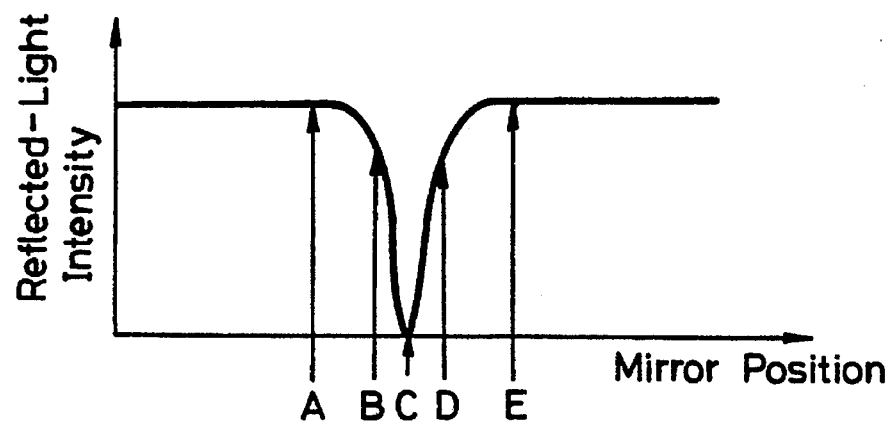
FIG. 4C is a graph showing a relation between the movement of the mirror of the optical resonator and a reflected-light intensity.
Figure 5:
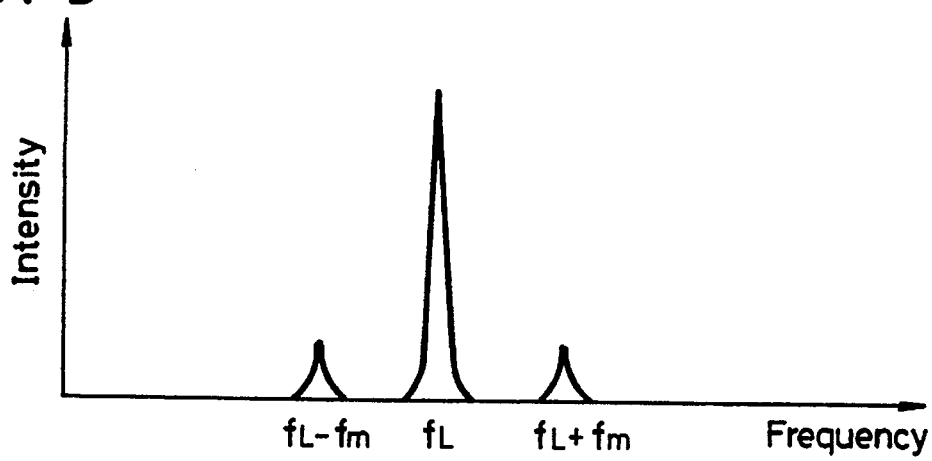
FIG. 5 is a graph showing a frequency spectrum of phase-modulated laser light.
Figure 7:
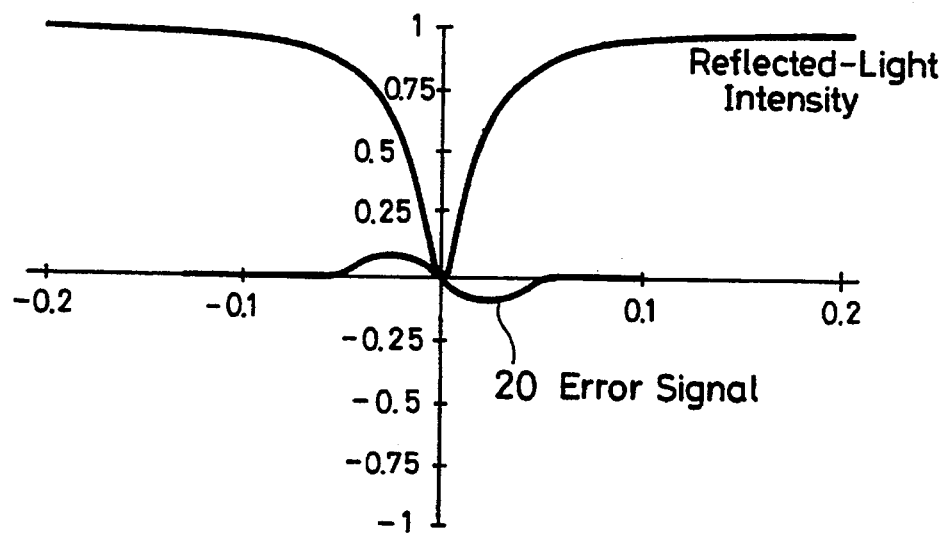
FIG. 7 is a graph showing an error signal.

An embodiment of the present invention will be described below. As shown in FIG. 1, a continuous-wave ultraviolet laser light generating apparatus according to the present invention includes a laser light source unit 1, a wavelength converting apparatus 4 which has an optical resonator 2 and a wavelength convertor 3 disposed in the optical resonator 2 and which is arranged such that laser light emitted from the laser light source unit 1 is wavelength-converted by the wavelength convertor 3 to derive continuous-wave ultraviolet laser light $L_{UL}$, a locking circuit 5 for locking a cavity length of the optical resonator 2 at a predetermined cavity length, and an electrooptic phase modulator 6 used for the locking. A Drever locking circuit for controlling the locking by using an FM side bands of the laser light is employed as the locking circuit 5.

The laser light source unit 1 derives green laser light with a wavelength of 532 nm from laser light from, for example, a continuous-wave Nd: YAG laser (not shown) by a second harmonic generator (SHG) (not shown).

The derived green laser light is introduced into the optical resonator 2 for external light of the wavelength converting apparatus 4. The optical resonator 2 is formed of at least one pair of mirrors, e.g., four mirrors $M_1$ to $M_4$ in the embodiment shown in FIG. 1. The wavelength convertor 3 is disposed in an optical path formed by the four mirrors $M_1$ to $M_4$. The wavelength convertor 3 is made of a nonlinear optical crystal of BBO (β-BaB$_2$O$_4$), for example.

As described above, the optical resonator 2 is arranged such that the mirror $M_1$, for example, is finely moved by a electromagnetic positioning apparatus, i.e., voice coil motor (VCM) 7 to thereby finely change or adjust an optical path length of the optical resonator 2. The Drever locking circuit 5 controls the VCM 7, i.e., a position of the mirror $M_1$, so that it is possible to make a resonance frequency of the optical resonator 2 coincident with a frequency of, for example, the green laser light introduced from the laser light source unit 1 into the optical resonator 2. The green laser light is effectively introduced into the optical resonator 2, thereby a desired ultraviolet laser light $L_{UL}$ with a wavelength of 266 nm being generated stably.

The electrooptic phase modulator 6 for the Drever locking is made of an electrooptic crystal having composition of ATiOXO$_4$ where A depicts any one of K, Cs, and Rb and X depicts any one of P and As. Specifically, the electrooptic phase modulator 6 is formed of an electrooptic crystal 11 made of KTP (KTiOPO$_4$), KTA (KTiOAsO$_4$), RTA (RbTiOAsO$_4$), RTP (RbTiOPO$_4$), and CTA (CsTiOAsO$_4$), i.e., made of KTP or its derivative.

Figure 9:
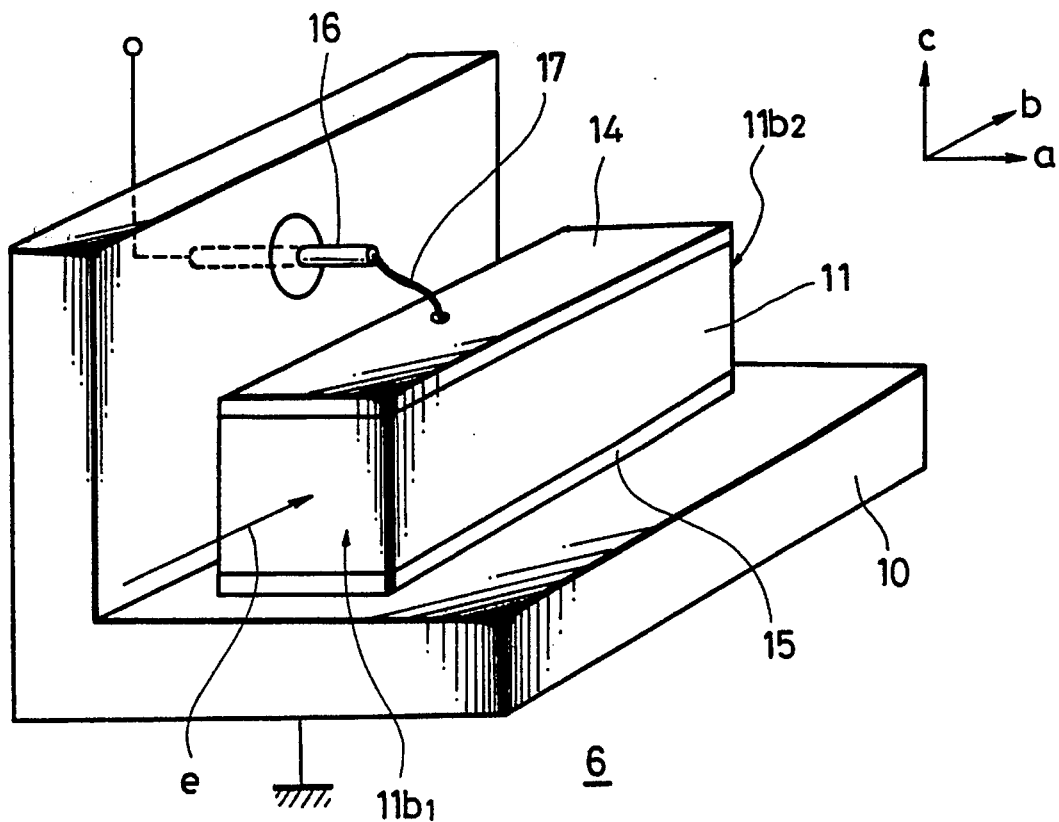
FIG. 9 is a perspective view of an electrooptic phase modulator according to an embodiment of the present invention.

Assuming that an optical path direction e in the electrooptic crystal 11 is an axis b and directions perpendicular to the axis b are axes a, c as shown in FIG. 9, then the electrooptic crystal 11 is shaped so as to have length of 3 mm, 12 mm and 3 mm in the respective directions of the axes a, b and c. Electrodes 14, 15 are deposited on side surfaces of the electrooptic crystal 11 opposed to the axis b, respectively. The electrooptic crystal 11 is mechanically mounted on a substrate 10 made of brass or the like with the ground side (cathode side) electrode 15 being electrically connected to the substrate 10 by a conductive adhesive. The substrate 10 has an anode side electrode terminal 16 which is electrically insulated therefrom and mechanically attached thereto. The anode-side electrode terminal 16 is electrically connected to the electrode 14 through a lead wiring 17 or the like.

The electrooptic crystal 11 has one end surface $11b_1$ on which the green laser light is incident, and the other end surface $11b_2$ which is opposed to the end surface $11b_1$ and from which the green laser light is emitted.

These end surfaces $11b_1$, $11b_2$ are optically ground and subjected to a non-reflective coating which minimizes loss of the green laser light.

Figure 10:
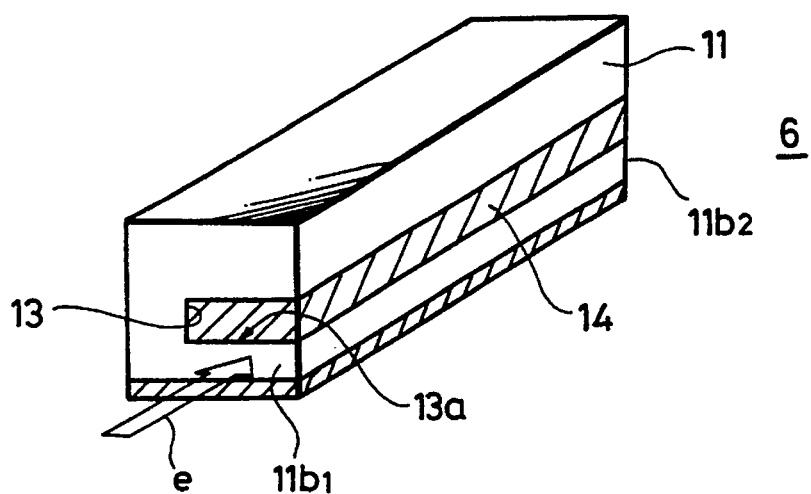
FIG. 10 is a perspective view of an electrooptic phase modulator according to another embodiment of the present invention.

While the electrodes 14, 15 are formed on the outside surfaces opposed to each other of the electrooptic crystal 11 in the embodiment shown in FIG. 9, another embodiment can be employed as shown in FIG. 10 which is a perspective view of the electrooptic crystal 11. Specifically, a groove 13 is formed along a c-plane of the electrooptic crystal 11 and then the other electrode, i.e., the anode side electrode 14 is formed by depositing or filling metal on or in the groove by some suitable methods such as evaporation, sputtering, nonelectolytic plating or the like. This arrangement allows an interval between the electrodes 14, 15 to be sufficiently reduced with a mechanical strength of the electrooptic crystal 11 being kept, and hence allows its modulation effect to be improved. Accordingly, it is possible to reduce the drive voltage more.

It is possible to provide on the substrate 10 a lid body (not shown) for covering the electrooptic crystal 11. The lid body in this case is used to prevent dusts and an electric shock. It is unnecessary to airtightly shield the electrooptic crystal 11 from the outside by the lid body. Accordingly, the lid body does not require a window disposed for keeping airtightness. Since the electrooptic crystal 11 is miniaturized due to its high figure of merit and the lid body is simplified, it is possible to set the overall size of the electrooptic phase modulator 6 to 13 mm (width)×20 mm (length)×13 mm (height). The size of the electrooptic phase modulator 6 corresponds to 30% of that of the above-mentioned commercially-available small-sized modulator made of KDP.

In the continuous-wave ultraviolet laser light generating apparatus having the above arrangement of the present invention, the green laser light (with a wavelength of 532 nm) with a maximum power of 10 W emitted from the laser light source unit 1, for example, is incident on the electrooptic phase I modulator 6 from the end surface $11b_1$ of the electrooptic crystal 11 in the direction shown by an arrow e in FIGS. 9 and 10. A beam diameter inside the phase modulator 6 is about 2 mm and an optical density thereof is about 300 W/cm$^2$ at most. The electrooptic crystal 11 made of KTP or its derivative, particularly made of KTP, is highly resistant to the optical damage and hence free from the optical damage even when the optical density is 100 kW/cm$_2$ or greater. Therefore, the electrooptic crystal made of KTP enables modulation of such high-power laser light.

The amplitude β of the phase modulation for the Drever locking in the electrooptic phase modulator 6 is about β=0.1. When the electrooptic phase modulator 6 is formed of the electrooptic crystal 11 made of KTP, the figure of merit of the phase modulation is 235 pm/V. Therefore, assuming that the electrooptic crystal 11 has a crystal size of 3×13×3 (mm$^3$) as described above, then an amplitude $V_o$ of a voltage applied between the electrodes 14 and 15 of the electrooptic crystal 11 is $V_o$=18 V. This is about one-sevenths drive voltage employed when the above-mentioned electrooptic crystal made of KDP is employed, which reveals that the drive voltage is improved considerably.

According to the first embodiment of the present invention, the electrooptic phase modulator 6 modulates the intensity of an ultraviolet laser light. Since the drive voltage of the electrooptic phase modulator 6 is reduced as described above, it is possible to modulate the intensity of the ultraviolet laser light $L_{UL}$ by modulating the phase modulation depth β. In this case, a drive voltage amplitude required to set the ultraviolet laser light intensity to 0 is $V_o$=430 V which can be obtained by a normal high-frequency amplifier with ease.

Figure 11:
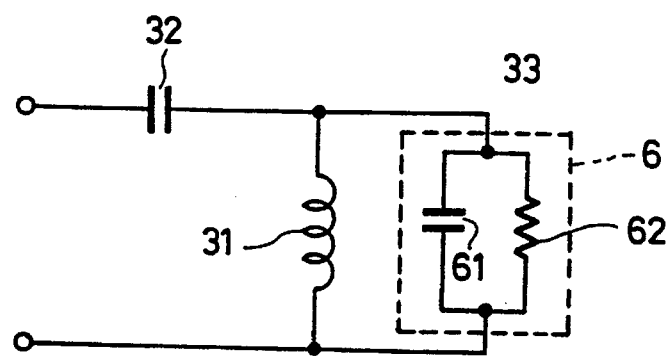
FIG. 11 is a diagram showing a resonator circuit of the electrooptic phase modulator.

According to another embodiment of the present invention, as shown in FIG. 11, a resonator circuit 33 is arranged by adding an inductor 31 and a capacitor 32 to the electrooptic phase modulator 6. This arrangement allows the phase modulation with a lower voltage which is obtained by amplifying an AC voltage input to the electrooptic phase modulator 6. Specifically, since the continuous-wave ultraviolet laser light generating apparatus effects the phase modulation with a single frequency Ω, if a resonator circuit resonating at Ω=10 MHz is previously designed, then it is possible to effect the Drever locking and the phase modulation of the ultraviolet laser light with a lower voltage. When a constant of the resonator circuit 33 is determined, an equivalent circuit of the electrooptic crystal or the like is designed as a parallel circuit of a capacitor 61 and a resistor 62 as shown in FIG. 11 because KTP or its derivative composing the electrooptic crystal 11 has high electric conductivity, i.e., high ion conductivity in the direction of the axis c. Moreover, in this case, for reducing a reflection loss, the resonator circuit 33 is designed so that an impedance of the phase modulator should be 50 Ω.

According to the present invention, as described above, since the electrooptic phase modulator 6 is formed of the electrooptic crystal 11 made of KTP or its derivative, it is possible to lower the voltage applied to the phase modulator 6. For example, when the electrooptic crystal made of KTP, KDP and ADP each having the same size are employed, an amplitude voltage with which the electrooptic crystal made of KTP is operated is 14% of the amplitude voltage for the electrooptic crystal made of KDP and 11% of the amplitude voltage for electrooptic crystal made of ADP.

As a result, as described above, it is possible to modulate the intensity of the ultraviolet laser light with ease.

While in the above embodiments the laser light source unit 1 emits green laser light which is visible light and second harmonic of a Nd: YAG laser and the continuous-wave ultraviolet laser light is obtained from the second harmonic, the present invention is not limited thereto. The laser light source unit may be some high-power lasers of light from visible light to near-infrared ray such as a titanium: sapphire laser, a laser diode or the like. It is possible to apply the arrangement according to the present invention to second harmonic generation of the above lasers or stabilization of a laser oscillating wavelength. At this time, it is possible to achieve the same effect as described above.

Having described preferred embodiments of the present invention with reference to the, accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A continuous-wave ultraviolet laser light generating apparatus comprising:

a laser light source unit for generating laser light from visible light to near-infrared light;

a wavelength converting means which comprises an optical resonator and a wavelength convertor disposed in said optical resonator for converting a wavelength of incident laser light, and converts the laser light from said laser light source unit into continuous-wave ultraviolet laser light to emit the latter;

a locking means for adjusting said optical resonator so as to have a predetermined cavity length; and an electrooptic phase modulator for modulating a phase of the laser light from said laser light source unit in response to a resonance frequency of said optical resonator, wherein said electrooptic phase modulator is made of an electrooptic crystal having a composition of ATiOXO$_4$ where A depicts any one of K, Cs and Rb and X depicts any one of P and As.

2. A continuous-wave ultraviolet laser-light generating apparatus according to claim 1, wherein a groove is formed on said electrooptic crystal of the electrooptic phase modulator along an optical path direction and an electrode is formed along said groove.

3. A continuous-wave ultraviolet laser light generating apparatus according to claim 1, wherein said electrooptic phase modulator comprises a resonator circuit for amplifying an input AC voltage.

4. A continuous-wave ultraviolet laser light generating apparatus according to claim 1, wherein said electrooptic phase modulator modulates an intensity of ultraviolet laser light by modulating a modulation depth.

5. A continuous-wave ultraviolet laser light generating apparatus according to claim 1, wherein said locking means comprises a Drever locking circuit.

* * * * *